United States Patent
Lee et al.

(10) Patent No.: US 9,916,085 B2
(45) Date of Patent: Mar. 13, 2018

(54) MOBILE TERMINAL

(71) Applicant: LG Electronics Inc., Seoul (KR)

(72) Inventors: Suyoung Lee, Seoul (KR); Hyunjoo Jeon, Seoul (KR)

(73) Assignee: LG Electronics Inc., Seoul (KR)

(*) Notice: Subject to any disclaimer, the term of this patent is extended or adjusted under 35 U.S.C. 154(b) by 511 days.

(21) Appl. No.: 14/484,958

(22) Filed: Sep. 12, 2014

(65) Prior Publication Data
US 2015/0082230 A1   Mar. 19, 2015

(30) Foreign Application Priority Data
Sep. 13, 2013   (KR) .................. 10-2013-0110584

(51) Int. Cl.
| | | |
|---|---|---|
| *G06F 3/048* | (2013.01) | |
| *G06F 3/0488* | (2013.01) | |
| *G06F 3/0481* | (2013.01) | |
| *G06F 3/0482* | (2013.01) | |

(52) U.S. Cl.
CPC ........ *G06F 3/04886* (2013.01); *G06F 3/0482* (2013.01); *G06F 3/04817* (2013.01)

(58) Field of Classification Search
CPC ............. G06F 3/04886; G06F 3/04817; G06F 3/0482; G06F 3/0488; G06F 3/03549; G06F 3/0485; G06F 3/04845; G06F 3/03547
See application file for complete search history.

(56) References Cited

U.S. PATENT DOCUMENTS

| | | | | |
|---|---|---|---|---|
| 2010/0007604 A1* | 1/2010 | Wang | .................... | G06F 3/0488 345/158 |
| 2010/0177042 A1* | 7/2010 | Chen | ....................... | G06F 3/038 345/159 |
| 2010/0253620 A1* | 10/2010 | Singhal | ................. | G06F 3/0488 345/157 |
| 2011/0169749 A1* | 7/2011 | Ganey | ................... | G06F 1/1626 345/173 |
| 2012/0044164 A1* | 2/2012 | Kim | ..................... | G06F 3/04842 345/173 |
| 2013/0027301 A1* | 1/2013 | Shen | ...................... | G06F 3/0488 345/158 |
| 2013/0241829 A1* | 9/2013 | Kim | .................... | G06F 3/03547 345/157 |
| 2013/0241842 A1* | 9/2013 | Ma | ........................ | G06F 3/0412 345/173 |
| 2014/0184503 A1* | 7/2014 | Jang | ...................... | G06F 3/0488 345/158 |
| 2016/0246489 A1* | 8/2016 | Kuo | ...................... | G06F 3/0488 |

* cited by examiner

*Primary Examiner* — Rashawn Tillery
(74) *Attorney, Agent, or Firm* — Dentons US LLP

(57) ABSTRACT

The present disclosure provides a mobile terminal including a display unit configured to enable a touch input, and a controller configured to execute a first touch sensing mode for processing a touch input applied to a specific position of the display unit as a control command for the specific position, wherein the controller configured for cooperating with the display unit to: execute a second touch sensing mode which is a different type of sensing mode from the first touch sensing mode, sense a user's touch input within a first region of the display unit in the second touch sensing mode, and process the user's touch input as a control command corresponding to a touch input to a second region of the display unit.

18 Claims, 14 Drawing Sheets

MOBILE TERMINAL

RELATED APPLICATION

This application claims the benefit of priority of Korean Patent Application No. 10-2013-0110584, filed on Sep. 13, 2013, which is herein expressly incorporated by reference in their entireties.

BACKGROUND OF THE INVENTION

1. Field of the Invention

The present disclosure relates to a mobile terminal, and more particularly, to a mobile terminal for sensing a touch input and a control method thereof.

2. Description of the related art

Terminals can be classified into two types, such as a mobile/portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player.

Various new attempts have been made for the multimedia devices in the aspect of hardware or software in order to implement such complicated functions. For example, a user interface environment is provided in order for users to easily and conveniently retrieve or select functions.

Also, many users have their mobile terminals to express their own personalities, and accordingly, various designs are required for the mobile terminal. Such designs may also include structural changes and improvements for the user to more conveniently use the mobile terminal. A manipulation unit may be considered as one of such structural changes and improvements.

Owning to the improvements, the user can generate an input signal using a touch sensor provided in the display unit of the terminal. However, there is a limit in that such a terminal in the related art performs only a control command for an icon or the like located at the user's touch position, and there has been a problem in that it is improper to a display device with a large-sized screen. Accordingly, the need for a terminal capable of generating an input signal using a new scheme has been raised.

SUMMARY OF THE INVENTION

An object of the present disclosure is to provide a mobile terminal capable of allowing a new type of user input which is different from the related art.

Another object of the present disclosure is to provide a mobile terminal capable of allowing the user to easily make a touch input even on a large-sized screen.

In order to accomplish the foregoing objective, a mobile terminal associated with the present disclosure may include a display unit configured to enable a touch input, and a controller configured to execute a first touch sensing mode for processing a touch input applied to a specific position of the display unit as a control command for the specific position, wherein the controller configured for cooperating with the display unit to: execute a second touch sensing mode which is a different type of sensing mode from the first touch sensing mode, sense a user's touch input within a first region of the display unit in the second touch sensing mode, and process the user's touch input as a control command corresponding to a touch input to a second region of the display unit.

Furthermore, according to an example of the present disclosure, the controller may process a proximity touch to the first region as a touch input to information displayed in the second region in the second touch sensing mode. An indicator moved by the proximity touch may be displayed in the second region. The selection of information specified by the indicator may be carried out by a movement in the direction perpendicular to that of the proximity touch.

A distance moved by the indicator may be determined according to the movement speed of the proximity touch. The indicator may move between selectable icons by a touch input among icons displayed in the second region.

Furthermore, according to another example of the present disclosure, an additional indicator may be displayed when a consecutive touch input is applied to the same position of the first region in a state that the indicator is displayed, and the indicator and additional indicator may be moved by a multi-touch applied to the first region. The multi-touch may be a gesture in which touch positions move closer or away from each other, and information displayed in the second region by the gesture may be zoomed out or in.

Furthermore, according to another example of the present disclosure, a direct touch to the first region may be processed as a touch input to information displayed in the first region.

Furthermore, according to another example of the present disclosure, a virtual touchpad may be displayed in the first region in the second touch sensing mode, and a touch input to the touchpad may be processed as a touch input to information displayed in the second region.

Furthermore, according to another example of the present disclosure, the first region may be disposed adjacent to at least one corner of the display unit, and the second region may be a region for partitioning the display unit along with the first region.

A boundary line for dividing the first and the second region may be displayed on the display unit, and the boundary line may be formed to be changed by the user's manipulation. An icon that is movable by a drag input may be displayed on the boundary line, and the boundary line may be changed by the movement of the icon. When an icon for displaying specific information displayed in the second region is selected by a touch input to the first region, the specific information may be displayed on the boundary line or in the first region. When a long touch is applied to the icon, a touch input to the second region may be processed as a different control command from the control command. The first region may be generated by a drag input for moving the icon while drawing a rotation locus along the boundary line.

Furthermore, according to another example of the present disclosure, said executing the second touch sensing mode may include sensing at least one of the user's fingerprint and gesture, and comparing at least one of the fingerprint and gesture with a preset criteria to determine whether or not to execute the second touch sensing mode. When a control command for releasing the second touch sensing mode is received, the first touch sensing mode may be carried out.

Furthermore, according to another example of the present disclosure, when an input window for entering text in the second region is selected in response to a touch input to the first region in the second touch sensing mode, a virtual keyboard may be displayed in the first region. When the virtual keyboard is displayed in the second touch sensing mode, an indicator displayed in the first region may disappear, and data entered using the virtual keyboard may be displayed in the input window.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
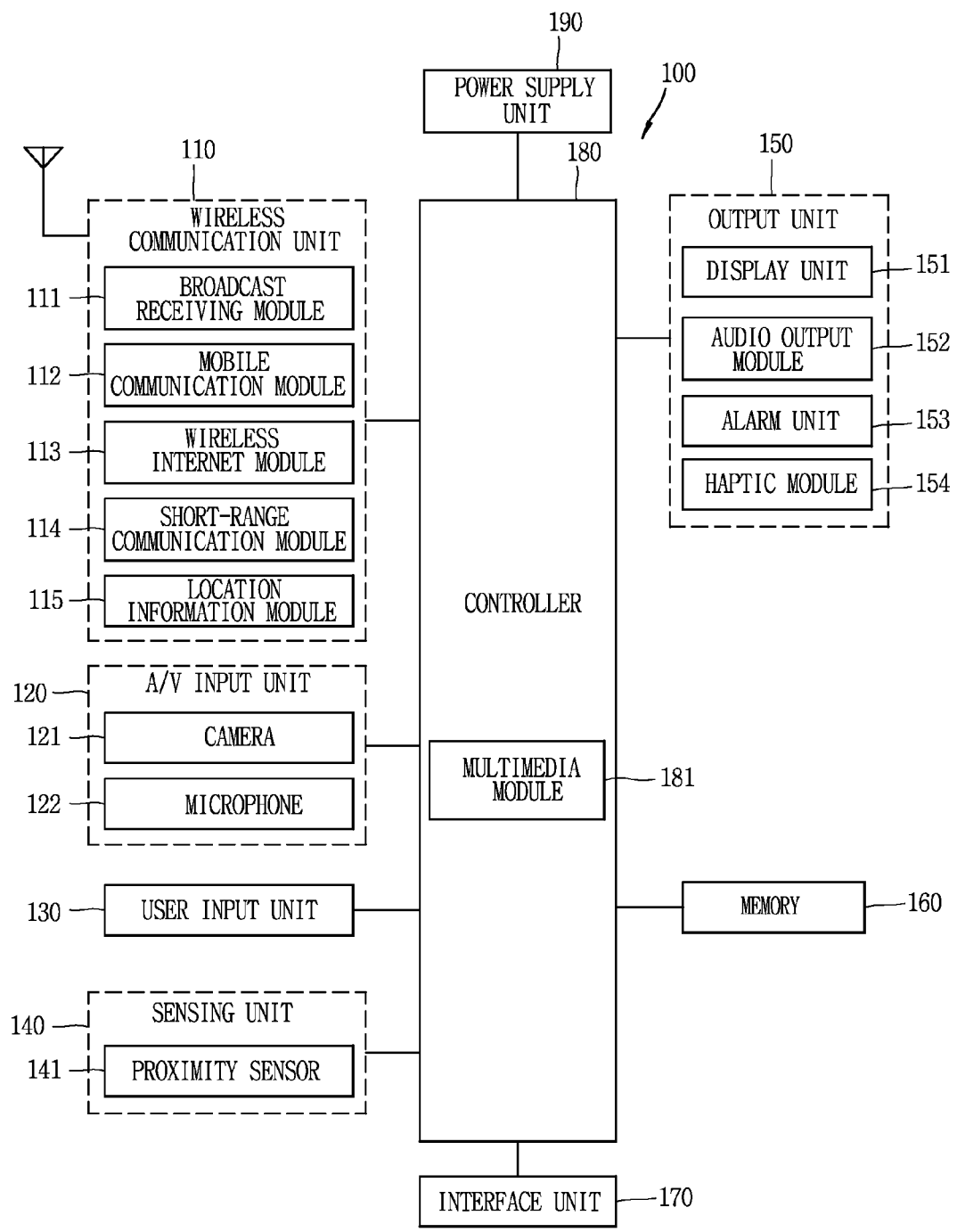
FIG. 1 is a block diagram illustrating a mobile terminal associated with an embodiment of the present disclosure.

Hereinafter, a mobile terminal associated with the present disclosure will be described in more detail with reference to the accompanying drawings. This specification employs like/similar reference numerals for like/similar components irrespective of different embodiments, so they all will be understood by the first description. The expression in the singular form in this specification will cover the expression in the plural form unless otherwise indicated obviously from the context.

A mobile terminal disclosed herein may include a portable phone, a smart phone, a laptop computer, a digital broadcast terminal, personal digital assistants (PDA), a portable multimedia player (PMP), a navigation, and the like.

FIG. 1 is a block diagram illustrating a mobile terminal associated with an embodiment of the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a GPS module as a representative example.

Referring to FIG. 1, the A/V(audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display module 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display module 151, an audio output module 152, an alarm unit 153, a haptic module 154, and the like.

The display module 151 may display (output) information processed in the mobile terminal 100. For example, when the mobile terminal 100 is in a phone call mode, the display module 151 may display a User Interface (UI) or a Graphic User Interface (GUI) associated with a call. When the mobile terminal 100 is in a video call mode or image capturing mode, the display module 151 may display a captured image and/or received image, a UI or GUI.

The display module 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display module 151 of the terminal body.

The display module 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display module 151 and a touch sensitive sensor (referred to as a "touch sensor") have an interlayer structure, the structure may be referred to as a "touch screen". The display module 151 may be used as an input device rather than an output device. The touch sensor may be implemented as a touch film, a touch sheet, a touch pad, and the like.

The touch sensor may be configured to convert changes of a pressure applied to a specific part of the display module 151, or a capacitance occurring from a specific part of the display module 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display module 151 has been touched.

Referring to FIG. 1, a proximity sensor 141 may be arranged at an inner region of the portable terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on.

The alarm 153 may output not only video or audio signals, but also other types of signals such as signals notifying occurrence of events in a vibration manner. Since the video or audio signals can be output through the display module 151 or the audio output unit 152, the display module 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the portable terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180.

Various embodiments described herein may be implemented in a computer-readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

The mobile terminal 100 as described above is formed to execute a first touch sensing mode and a second touch sensing mode. The first sensing mode and second touch sensing mode are modes for defining the processing object of a touch input in a different manner, and according to the present disclosure, the user's convenience is promoted using a plurality of sensing modes. Hereinafter, it will be described in more detail.

Figure 2A:
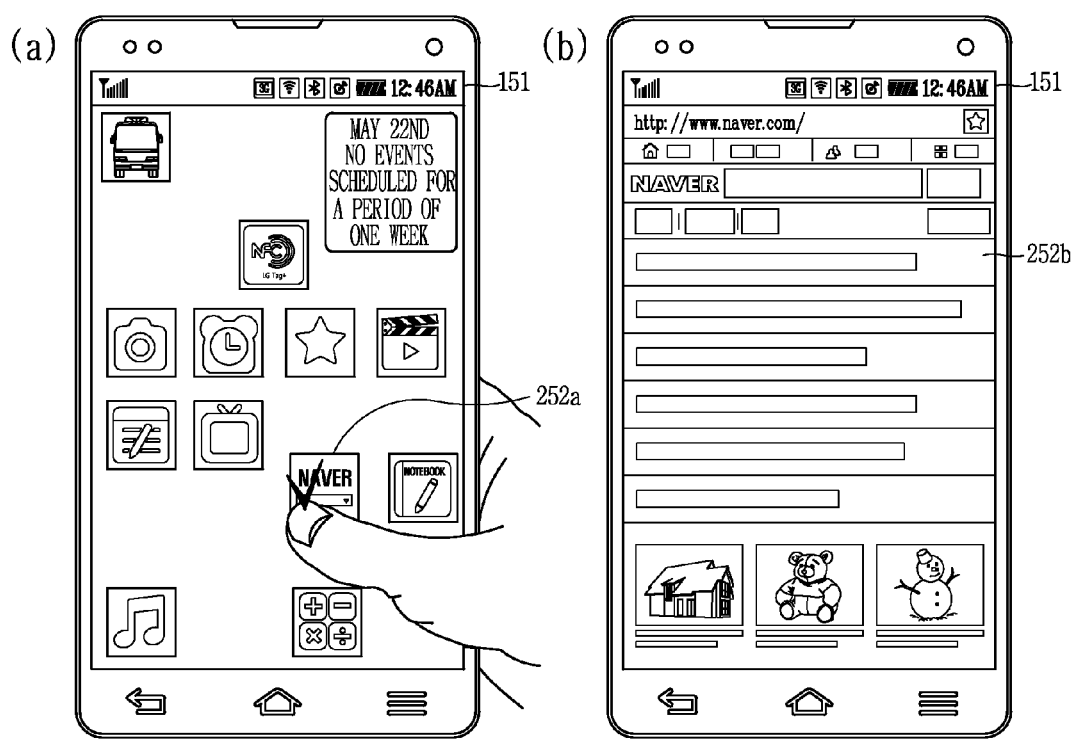
FIGS. 2A and 2B are conceptual views illustrating an operation implemented by the present disclosure.
Figure 2B:
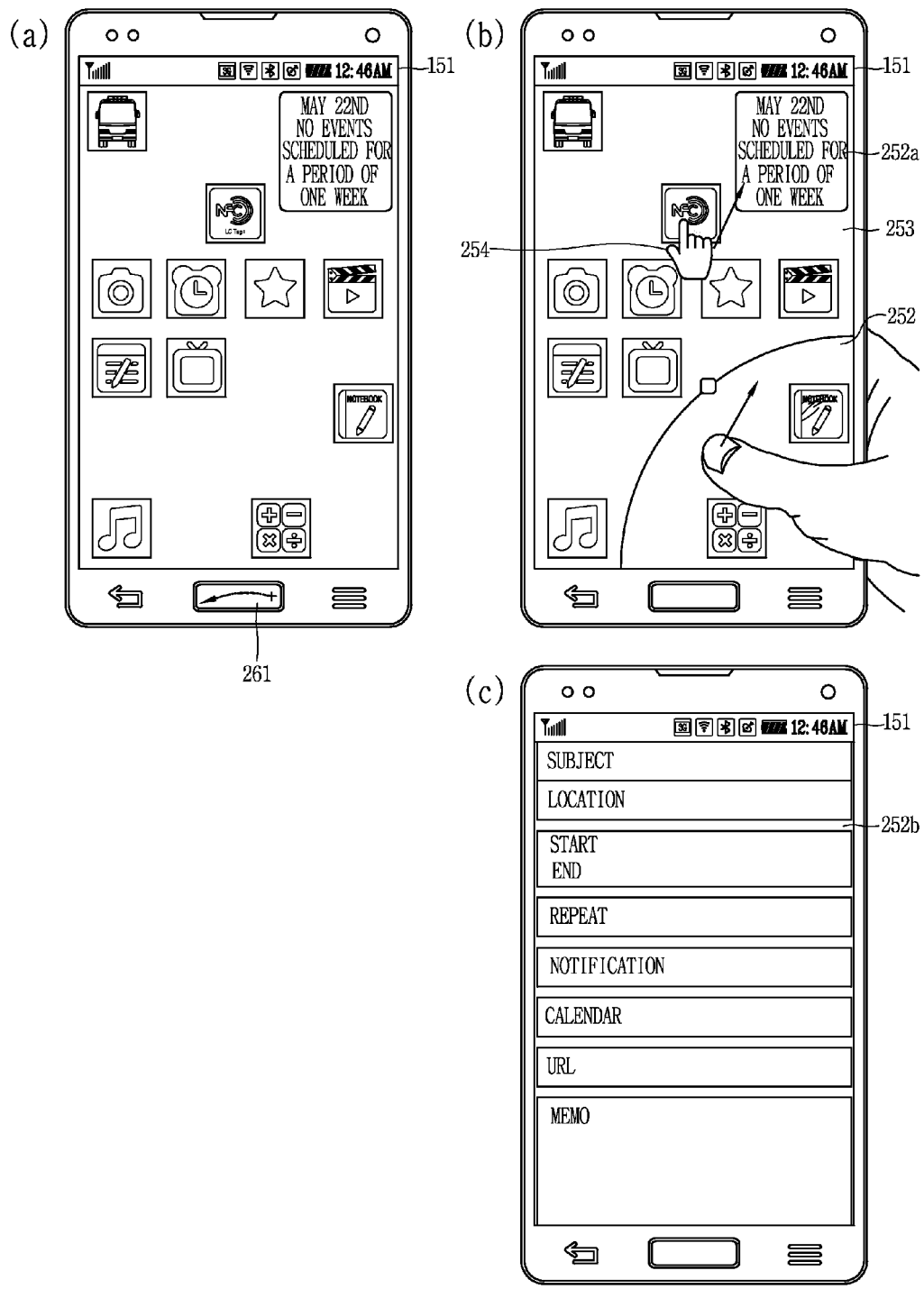

FIGS. 2A and 2B are conceptual views illustrating an operation implemented by the present disclosure.

Referring to the drawings, the terminal may include a display unit 151 disposed on a surface of the body, for example, on a front surface thereof. The display unit 151 may include a touch sensor for sensing a touch input. Screen information displayed on the display unit 151 may include various graphic objects, and in this case, the graphic object may be implemented in the form of an image, text, an icon, and the like.

According to the drawings, application icons installed in a mobile terminal while displaying a home screen page, folders in which the icons are stored, widget icons or the like may be displayed on the display unit 151 in the present illustration. Here, the icon, folder, or the like may be an example of the graphic object.

Here, the home screen page may be also referred to as an idle screen, and the home screen page can be displayed on the display unit 151 when the terminal is in an idle state.

FIG. 2A illustrates a first touch sensing mode, and according to the drawing, when a touch input is applied to a specific icon 252a, the execution screen 252b of an application associated with the icon 252a is displayed on the display unit 151. In this case, the touch input may be a contact touch (or direct touch; hereinafter, referred to as a "direct touch"). According to the present illustration, the application may be a web browser.

According to the drawing, when the user holds a terminal with his or her hand, the icon 252a may be an icon disposed at a location with which his or her finger comes in contact. However, as the terminal becomes larger in size, there may exist a region in which the user's touch input cannot be applied to the display unit with his or her hand holding the terminal. For such an example, a widget icon 252a may be disposed at one side of the display unit. If the user applies a touch to the widget icon 252a using his or her other hand, then the execution screen 252b is converted from the home screen page into a screen occupying the display unit 151 as a whole.

According to the present embodiment, a calendar widget is illustrated as the widget, and the user enters his or her desired data to each item of the execution screen 252b to record his or her schedule on the calendar.

According to the present disclosure, it is presented a function of executing the relevant control without applying a direct touch to the terminal in addition to the function of FIG. 2A. More specifically, for such an example, it is presented a method of displaying the execution screen of the relevant service without applying a direct touch to the widget icon 252a in FIG. 2B, wherein the touch mode becomes a second touch sensing mode which is different from the first touch sensing mode.

According to FIG. 2B(a), a fingerprint sensor 261 is disposed at a front surface of the terminal, and when a user applies a flicking touch to the fingerprint sensor 261, the terminal enters a second touch sensing mode.

According to FIG. 2B(b), the display unit 151 is partitioned into a first and a second region 252, 253 in the second touch sensing mode, and the terminal processes a touch input within the first region 252 as a touch input to the second region 253.

According to the drawing, the first region 252 and second region 253 may be regions with different types of displayed information or regions for partitioning one graphic user interface (GUI) on the display unit. For such an example, the home screen page may be displayed on a region in which the first region 252 and second region 253 of the display unit 151 are summed up. In this case, the display unit 151 displays visual information implemented in the form of an image, text, an icon or the like, but it may be switched to an inactive state when a predetermined period of time has passed or using a specific control command input.

More specifically, the first region 252 is disposed adjacent to at least one corner of the display unit, and the second region 253 may be a region for partitioning the display unit along with the first region 252. When the user holds a terminal with his or her one hand, he or she is able to easily apply his or her hand holding the terminal to the vicinity of the one corner, but unable to apply his or her hand to the vicinity of the diagonally opposite corner. In this case, the second region 253 as a region containing the opposite corner will be a target region of a touch applied to the first region 252.

In the second touch sensing mode, the controller senses a proximity touch to the first region 252. The proximity touch can sense it using various methods such as a change of electrical charge, a change of magnetic field, a change of illumination, a motion of the terminal, and the like. The proximity touch is an action of taking a touch gesture in the air, and thus defined as an air gesture (hereinafter, commonly described as a proximity touch). In this case, an indicator 254 that is moved by the proximity touch is displayed in the second region 253.

When the user's finger is moved within the first region 252, the indicator 254 may move within the second region 253 in response to this. When the indicator 254 is disposed on the widget icon 252a, and then the user releases the proximity touch, the controller process it as the selection of the widget icon 252a. For such an example, when an object applying a touch is moved in the direction of getting away from the display unit in a state that the indicator 254 is overlapped with the icon 252a, the widget is carried out to display the execution screen 252b on the display unit 151.

However, the present disclosure may not be necessarily limited to this embodiment, and other methods may be also applicable thereto, such as executing the selection of the icon 252a and the relevant application when the movement of a proximity touch is stopped. Furthermore, a gesture for executing the second touch sensing mode, a gesture for selecting the icon or the like may be set depending on the way the user wants to use it.

In this manner, when the user's touch input within the first region is processed as a touch input to the second region, the user can make a touch input up to a distant portion using only his or her hand holding the terminal. Hereinafter, the hardware configuration of a terminal will be described, and then the other embodiments of the user interface will be described in more detail.

Figure 3A:
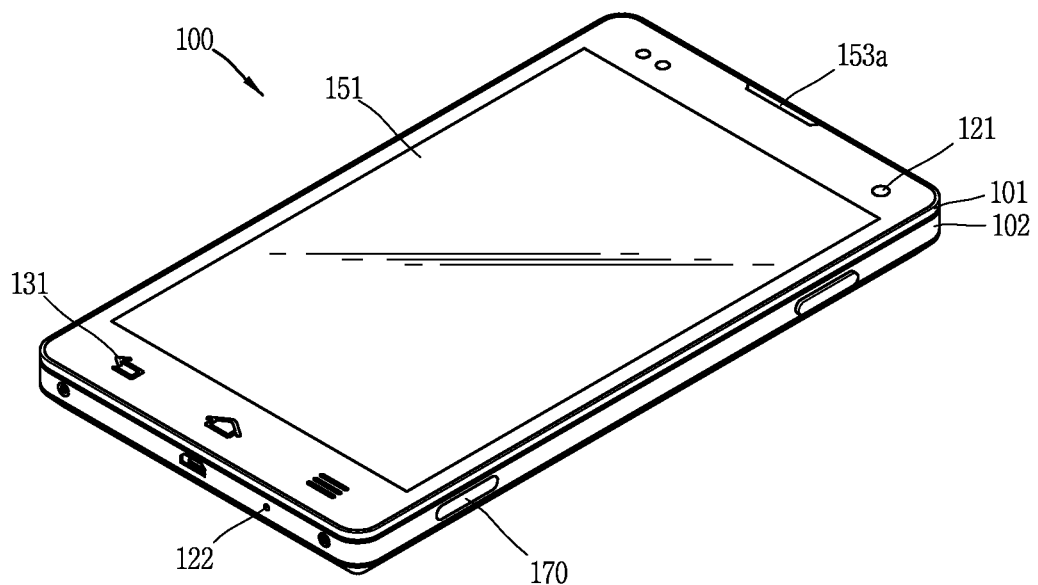
FIG. 3A is a front perspective view illustrating an example of a mobile terminal associated with the present disclosure.
Figure 3B:
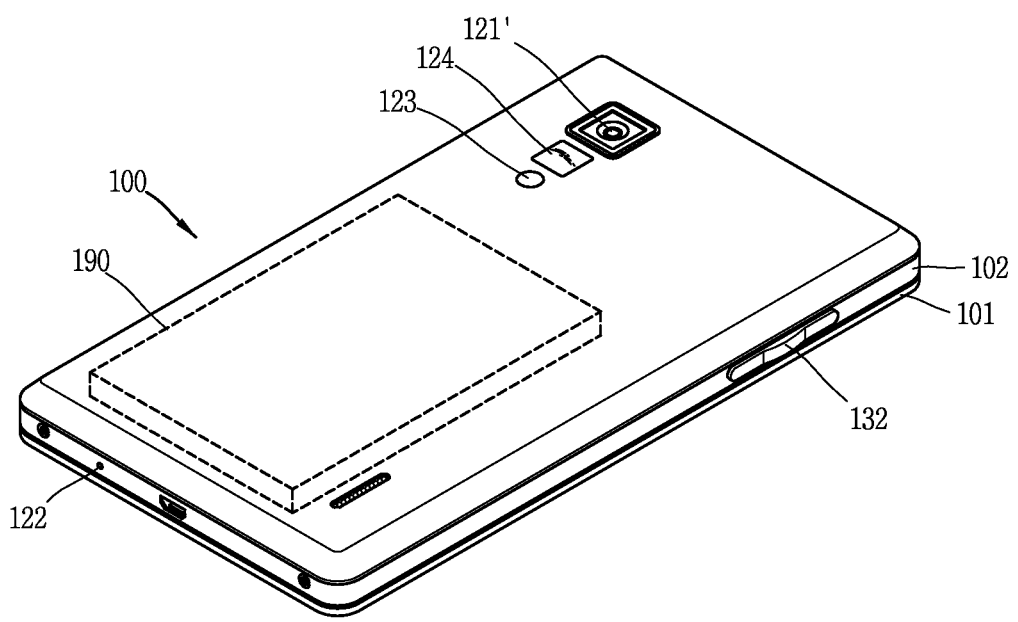
FIG. 3B is a rear perspective view illustrating a mobile terminal illustrated in FIG. 3A.

FIG. 3A is a front perspective view illustrating an example of a mobile terminal associated with the present disclosure, and FIG. 3B is a rear perspective view illustrating a portable terminal illustrated in FIG. 3A.

The mobile terminal 100 disclosed herein is provided with a bar-type terminal body. However, the present disclosure is not only limited to this type of terminal, but also applicable to various structures of terminals such as slide type, folder type, swing type, swivel type, and the like, in which two and more bodies are combined with each other in a relatively movable manner.

The body includes a case (casing, housing, cover, etc.) forming an appearance of the terminal. In this embodiment, the case may be divided into a front case 101 and a rear case 102. Various electronic components may be incorporated in a space formed between the front case 101 and the rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display module 151, an audio output module 152, a camera module 121, and the like may be mostly disposed at the front case 101. An interface (not shown) and the like may be disposed at lateral surfaces of the front case 101 and rear case 102.

The display unit 151 occupies most of a main surface of the front case 101. In other words, the display unit is disposed at a front surface of the terminal, and formed to display visual information. The audio output module 152 and camera module 121 are disposed at a region adjacent to one of both ends of the display module 151, and the front surface input unit 131 and microphone 122 are disposed at a region adjacent to the other end.

The front surface input unit 131 may include a plurality of manipulation units as an example of the user input unit 130 (refer to FIG. 1). The manipulation units may be commonly designated as a manipulating portion, and any method may be employed if it is a tactile manner allowing the user to perform manipulation with a tactile feeling. According to this embodiment, the front surface input unit 131 is configured with a touch key. Furthermore, the display unit 151 may form a touch screen along with a touch sensor, and in this case the touch screen may be a user input unit. Through this, the front surface of the terminal is formed with a form factor in which a push key is not disposed at a lower portion of the touch screen. However, the present disclosure may not be limited to this, and the front surface input unit 131 may be configured only with a push key or may have a configuration with no front surface input unit on the front surface of the terminal.

Referring to FIG. 3B, a camera module 121' may be additionally mounted on a rear surface of the terminal body, namely, the rear case 102. The camera module 121' has an image capturing direction, which is substantially opposite to the direction of the camera module 121 (refer to FIG. 3A), and may have a different number of pixels from that of the camera module 121.

For example, it is preferable that the camera module 121 has a relatively small number of pixels enough not to cause a difficulty when the user captures his or her own face and sends it to the other party during a video call or the like, and the camera module 121' has a relatively large number of pixels since the user often captures a general object that is not sent immediately. The camera modules 121, 121' may be provided in the terminal body in a rotatable or popupable manner.

Furthermore, a flash and a mirror may be additionally disposed adjacent to the camera module 121'. The flash illuminates light toward an object when capturing the object with the camera module 121'. The mirror 124 allows the user to look at his or her own face, or the like, in a reflected way when capturing himself or herself (in a self-portrait mode) by using the camera module 121'.

An audio output module may be additionally disposed on a rear surface of the terminal body. The audio output module on a rear surface thereof together with the audio output module 152 (refer to FIG. 3A) at a front surface thereof can implement a stereo function, and it may be also used to implement a speaker phone mode during a phone call.

A power supply unit 190 for supplying power to the mobile terminal 100 may be mounted on the terminal body. The power supply unit 190 may be configured so as to be incorporated in the terminal body, or directly detachable from the outside of the terminal body.

Referring to FIG. 3A again, furthermore, a touch screen configured with a touch sensor on the display unit 151 is formed to recognize both a direct touch and a proximity touch. In order to sense the proximity touch, the terminal may be additionally provided with another type of touch sensing mechanism.

Furthermore, a terminal according to the present disclosure may process the direct touch and proximity touch in a distinguished manner according to the touch sensing mode, and a control method of such a user interface will be described below in more detail.

Figure 4:
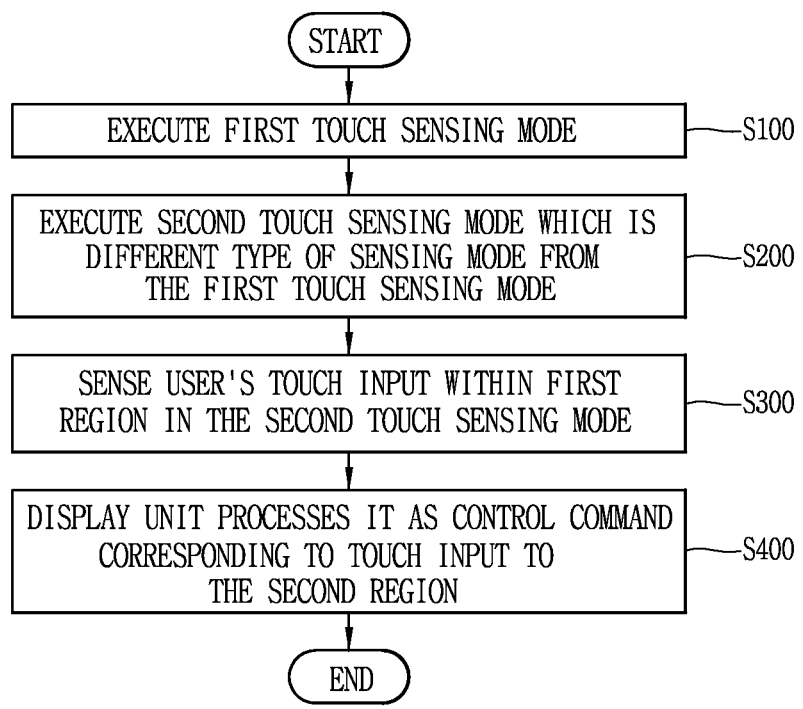
FIG. 4 is a flow chart illustrating the control flow of a user interface implemented by the present disclosure.

FIG. 4 is a flow chart illustrating the control flow of a user interface implemented by the present disclosure.

According to the foregoing control method, first, either one of the first touch sensing mode and second touch sensing mode is carried out (S100).

The first touch sensing mode may be a mode in which a touch input applied to a specific position of the display unit is processed as a control command to the specific position. In other words, when a touch is applied to a specific icon displayed on the display unit, the controller performs control associated with the icon. Here, the touch may include a proximity touch as well as a direct touch.

Next, the display unit and controller are combined with each other to execute a second touch sensing mode which is a different sensing mode from the first touch sensing mode (S200). More specifically, said executing the second touch sensing mode (S200) may include sensing at least one of the user's fingerprint and gesture, and comparing at least one of the fingerprint and gesture with a preset criteria to determine whether or not to execute the second touch sensing mode.

The execution of the second touch sensing mode may be carried out by the user entering a specific control command. The specific control command may be a gesture for fingerprint recognition, for example. For such an example, when a touch flicking is applied to the fingerprint sensor, the fingerprint sensor recognizes a flicking gesture along with his or her fingerprint to execute the second touch sensing mode.

For another example, the specific control command may be a touch input with a specific pattern. Furthermore, the specific pattern may be set by the user. For such an example, the specific pattern may be set in the symbol form of a pattern drawing a circle, a triangle, a square or the like, a pattern drawing a check indicator, a pattern drawing an "X" indicator, or the like. For still another example, the specific pattern may be a pattern writing a text. For example, writing an alphabet letter such as "I" or the like on the graphic object may be a specific pattern.

For yet still another example, the specific control command may be defined by a proximity touch. For such an example, it may be an input for allowing a finger to stay for a predetermined period of time or drawing a specific pattern at a location in proximity to the display unit.

In the second touch sensing mode, screen information displayed on the display unit may vary its processing according to a touch based on the region. The screen information may be a home screen page as described above, but for another example, may be a lock screen in a lock mode, an execution screen of a specific function, an execution screen of an application, and the like.

Next, the display unit and controller are combined with each other to sense the user's touch input within a first region on the display unit in the second touch sensing mode (S300).

The touch input within the first region may be a different scheme from a direct touch in the first touch sensing mode, but the present disclosure may not be necessarily limited to this. For example, a touch pad may be overlapped with the screen information of the first region, and a direct touch to the touch pad may be a touch input within the first region.

Furthermore, a direct touch to the first region within the second touch sensing mode may be processed as a touch input to information displayed in the first region.

The sensing of the touch may be carried out by the sensing unit. The sensing unit may be a touch sensor, and combined with the display unit to form a touch screen. For another example, the sensing unit may be a different type of sensor capable of recognizing a touch applied to the display unit, such as an ultrasonic sensor, an acceleration sensor, a magnetic sensor, and the like.

Finally, the display unit and controller are combined with each other to process the user's touch input as a control command corresponding to a touch input to the second region on the display unit (S400). In other words, the controller processes a proximity touch to the first region as a touch input to information displayed in the second region in the second touch sensing mode.

For example, an indicator is displayed in the second region, and the indicator is moved by the proximity touch. The indicator can be controlled within the second region using a touch input within the first region. In this case, the second region may be configured to enable a direct touch. When a direct touch is applied to the second region, it may be switched to the first touch sensing mode while releasing the second touch sensing mode.

In this case, the selection of information indicated by the indicator can be carried out by a movement in the direction perpendicular to that of the proximity touch. For such an example, the release of the proximity touch or the like may be illustrated. For another scheme, when the proximity touch stays at a specific position for a predetermined period of time, a position of the second region corresponding to the specific position indicated by the indicator may be selected.

According to such a control method, the movement of a finger touch and an indicator can be made at the same time on one screen of the terminal, and through this each region of the display unit can be used in various ways.

Hereinafter, various embodiments of the foregoing control method of a user interface will be described in more detail. FIGS. 5 through 13 are conceptual views illustrating a user interface implemented by the present disclosure.

Figure 5:
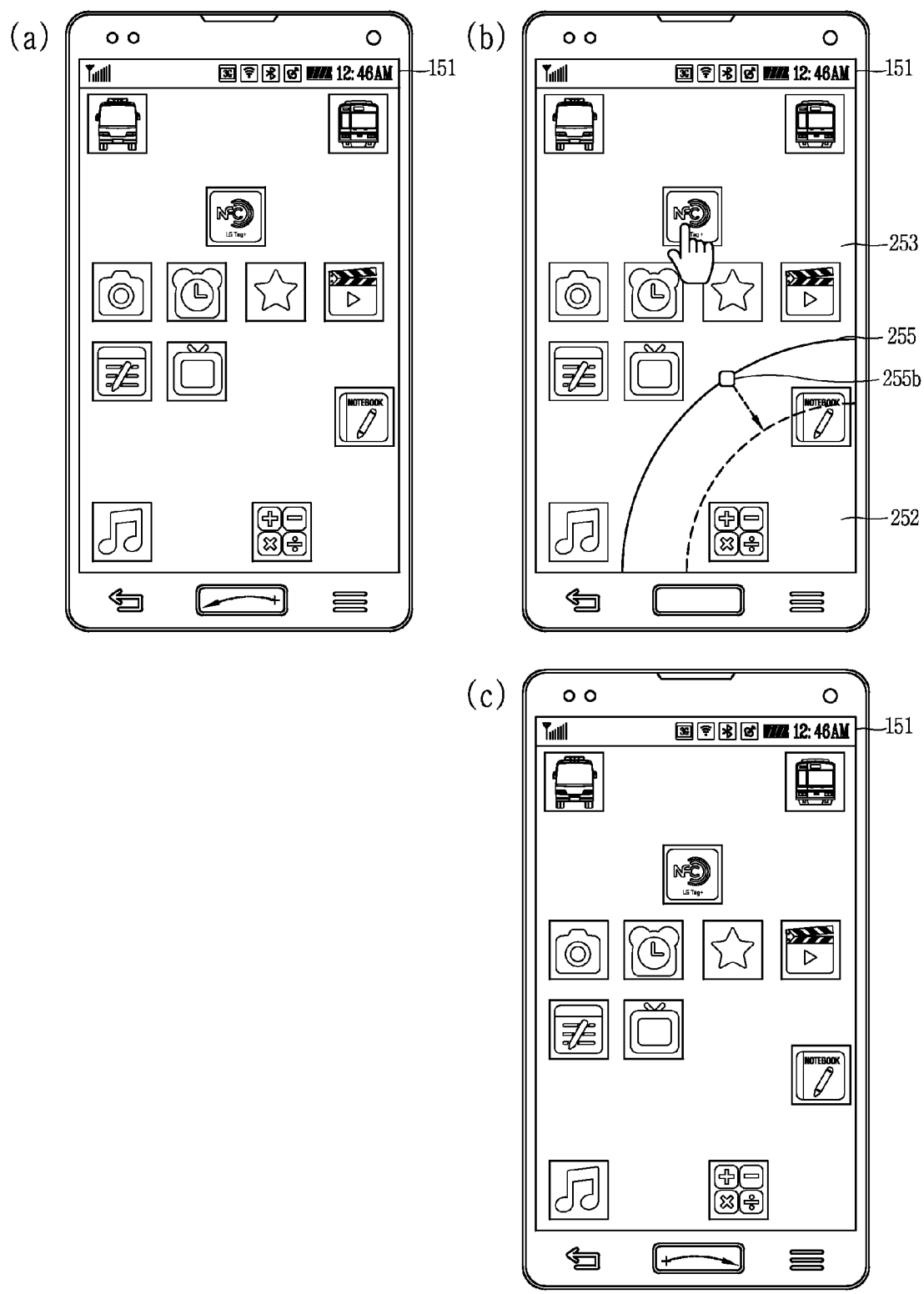
FIGS. 5 through 13 are conceptual views illustrating a user interface implemented by the present disclosure.
Figure 6:
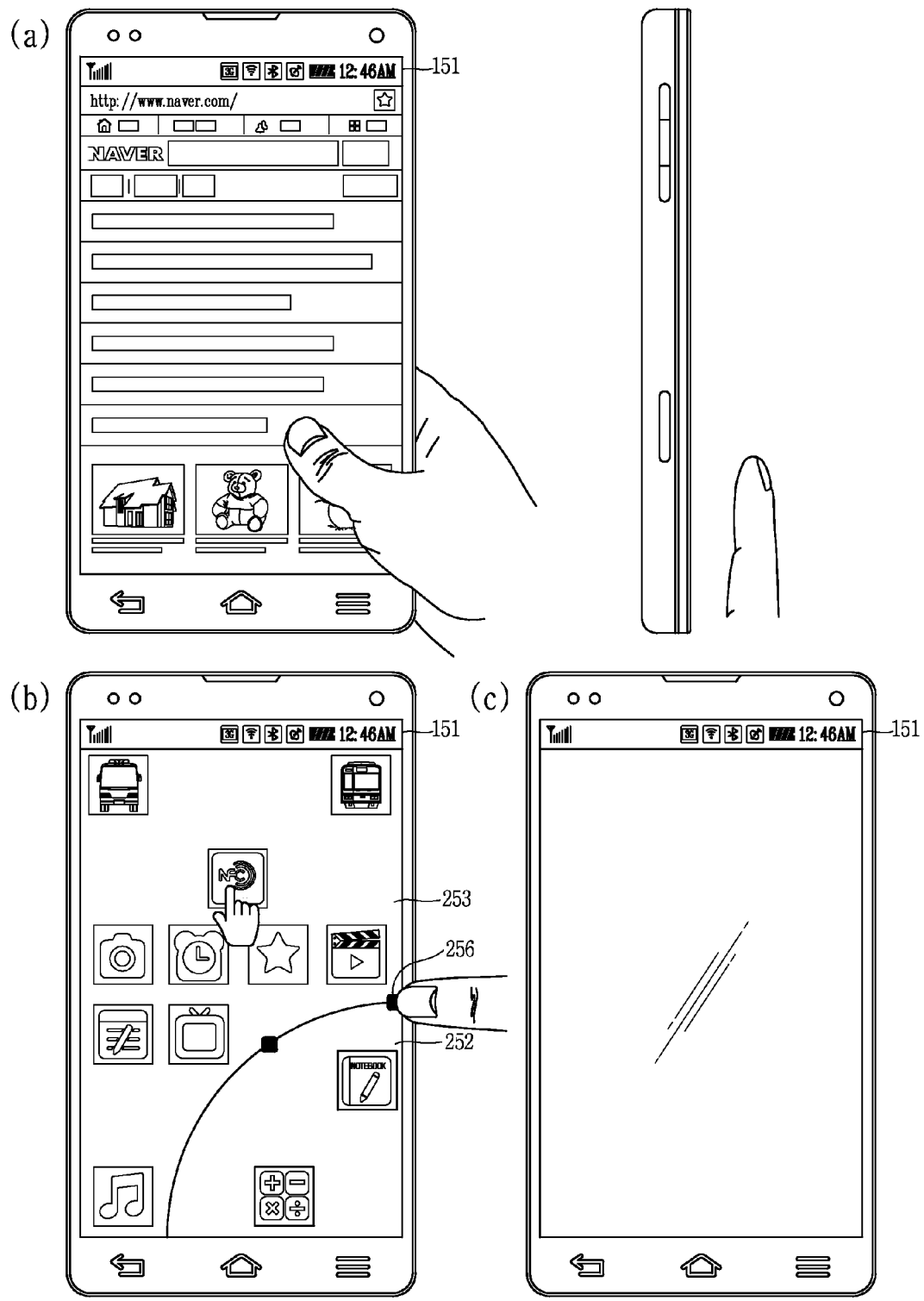

FIGS. 5 and 6 are conceptual views illustrating a method of executing, controlling and terminating a second touch sensing mode according to the embodiments of the present disclosure.

Referring to FIG. 5A(a), a second touch sensing mode is carried out using a method similar to that of FIG. 2B(a). In other words, a fingerprint sensor 261 is disposed at a front surface of the terminal, and when the user applies a flicking touch to the fingerprint sensor 261 in the first direction, the terminal enters the second touch sensing mode. The first direction may be a width direction of the terminal as illustrated in the drawing.

At this time, the display unit 151 is partitioned into a first and a second region 252, 253, and the terminal processes a touch input within the first region 252 as a touch input to the second region 253.

Referring to FIG. 5B, a boundary line 255 for dividing the first and the second region 252, 253 is displayed on the display unit 151. For example, the first and the second region 252, 253 may be regions with different shades, and in this case, the boundary line 255 may be a reference line at which the shades vary at both sides thereof.

For another example, the boundary line 255 as a line drawn on one graphic user interface (GUI) may be overlapped with the graphic user interface. More specifically, the execution screen of a specific application in the second touch sensing mode may be an execution screen in which a boundary line is drawn on the execution screen of the first touch sensing mode. In this case, the boundary line 255 may be displayed in a transparent or semi-transparent manner not to hide the overlapped execution screen.

Furthermore, the boundary line 255 may be popped up as an outer circumferential image in the shape of a quadrant circle while at the same time entering the second touch sensing mode. The center of the quadrant circle shape may be located at least one corner of the display unit, and accordingly, the first region 252 may be an inner region of the quadrant circle. In this case, when the user holds the terminal with his or her one hand, the first region may be easily touched using his or her hand holding the terminal, thereby allowing the user to more conveniently apply a touch input to the second region.

Furthermore, according to the drawing, the boundary line 255 is formed to be varied by the user's manipulation. For example, an icon 255b that is movable by a drag input is displayed on the boundary line 255, and the boundary line 255 is changed by the movement of the icon 255b.

More specifically, when the user applies a touch input to the icon 255b and then drags it in the radial direction of the quadrant circle shape, the boundary line 255 is moved in the direction of increasing or decreasing the size of the quadrant circle shape (or the area of the first region) along with the icon 255b. When the user releases his or her touching finger, the size of the first and the second region 252, 253 is fixed, and the user can use the terminal in the second touch sensing mode.

For another example, a change of the size of the boundary line 255 may be carried out within a specific range. For example, even though the boundary line 255 is moved in the direction of decreasing or increasing the area of the first region, the size thereof will not be decreased or increased any more when it reaches the lower or upper limit. Through this, it may limit the user's malfunction.

Finally, referring to FIG. 5C, when the user applies a flicking touch to the fingerprint sensor 261 in the second direction, the terminal releases the second touch sensing mode. The fingerprint sensor senses a fingerprint along with the user's flicking gesture to execute the first touch sensing mode while at the same time releasing the second touch sensing mode. The second direction may be a direction opposite to the first direction which is a flicking direction in case of executing the second touch sensing mode.

When the second touch sensing mode is released along with the flicking touch in the second direction, a division between the first and the second region 252, 253 disappears on the display unit. In other words, the first touch sensing mode is carried out while the boundary line 255 disappears.

The execution and termination of the second touch sensing mode may be modified in various forms to provide convenience to the user.

The direct touch and proximity touch applied to a specific icon displayed on the display unit in the first touch sensing mode may be processed as the same control command. For such an example, an operation of applying a short touch to the specific icon and the user's finger applying a touch input separated by a predetermined distance but stays at a location overlapped with the specific icon may be processed as the selection of the specific icon.

In this case, another type of proximity touch may be defined as the execution of the second touch sensing mode. For such an example, referring to FIGS. 6A and 6B, the execution screen of a specific application in the first touch sensing mode is displayed on the display unit.

At this time, when the user's finger draws a specific pattern or stays for a predetermined period of time at a location separated from the display unit, the second touch sensing mode is carried out while releasing the first touch sensing mode. The present illustration may be particularly used in a useful manner when the terminal is not provided with a fingerprint sensor.

The foregoing illustration may be all applicable to the control, regional division or the like in the second touch sensing mode. However, contrary to the foregoing illustration, according to the present illustration, a release icon 256 for releasing the second touch sensing mode may be displayed in the first region 252. The first touch sensing mode may be carried out when releasing the second touch sensing mode using a touch input to the release icon 256. However, according to the present illustration, for such an example, if the release icon 256 is released as illustrated in FIG. 6C, then a lock mode may be carried out while releasing the second touch sensing mode.

The lock mode is a mode in which a touch input to at least part of the display unit 151 is restricted, for instance, only a touch input associated with the operation of releasing a lock state may be enabled in the lock mode. In this case, in the lock mode, a lock screen may be a screen that is displayed when there is a user's control command in a state that the display unit 151 is disabled.

Figure 7:
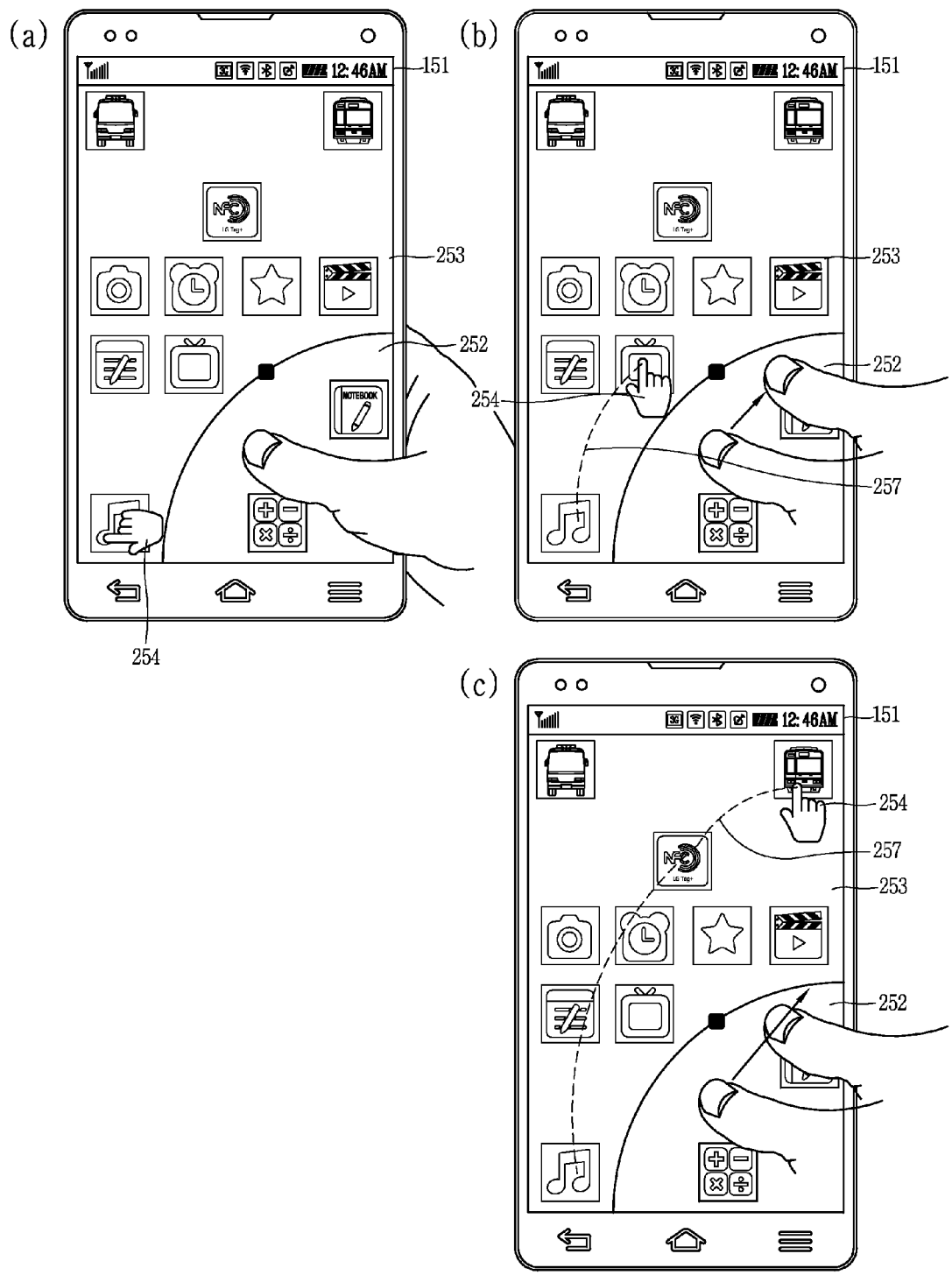

FIG. 7 illustrates an example in which a mutual relation between the first and the second region is set for the control of an indicator, as an extended example of the control method of FIG. 5.

FIG. 7A illustrates a state in which the indicator 254 being moved by a proximity touch is displayed in the second region 253 in the second touch sensing mode. In this state, when the user's finger is moved within the first region 252, the indicator 254 is moved within the second region 253 in response to this. At this time, the indicator 254 is moved in the relevant angle direction according to the finger's moving angle.

Referring to FIGS. 7B and 7C, a distance moved by the indicator 254 may be determined by the movement speed of the proximity touch. More specifically, as illustrated in FIG. 7B, when the user's finger moves slowly, the indicator 254 is moved to an icon (or button) in proximity thereto according to the finger's direction. On the contrary, as illustrated in FIG. 7C, when the user's finger moves fast, the indicator 254 is moved fast according to the finger's direction to an icon (button) spaced apart therefrom. In other words, the movement distance of the indicator 254 is increased as increasing the movement speed.

Furthermore, the indicator 254 can be moved between selectable icons by a touch input among icons displayed in the second region 253. More specifically, when the user's finger moves slowly, the indicator 254 is sequentially moved to select an icon adjacent thereto on the movement path. On the contrary, when the finger moves fast, the indicator 254 jumps and moves to an icon at the end of the movement path without moving to an icon at the middle of the movement path. Through this, the user can more conveniently use a movement between objects.

Furthermore, according to the drawing, a guide line 257 capable of showing the direction of the user's gesture may be displayed on the display unit. The guide line 257 may be displayed along a path on which the indicator 254 has previously passed to show the direction of a proximity touch matched to the terminal.

Figure 8:
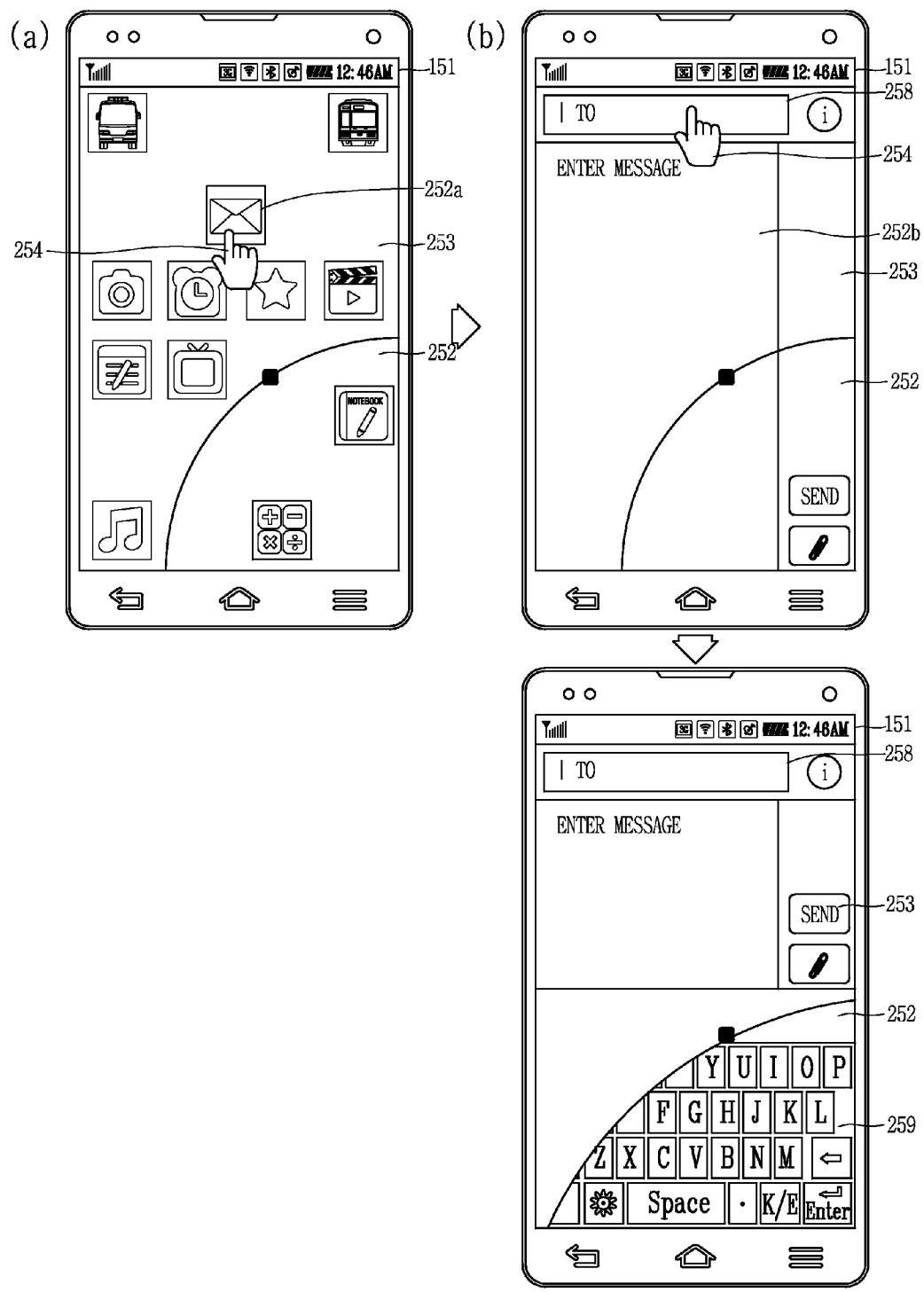

FIG. 8 illustrates an example of a method of using a second touch sensing mode in a specific mode, as one embodiment of the control method of FIG. 5.

According to the drawing, when an input window 258 for entering text to the second region 253 is selected in response to a touch input to the first region 252 in the second touch sensing mode, a virtual keyboard 259 is displayed. In this case, when the virtual keyboard 259 is displayed in the second touch sensing mode, the indicator 254 displayed in the first region 252 disappears, and data entered using the virtual keyboard 259 is displayed in the input window 258.

More specifically, an icon of an application installed in the mobile terminal or the like may be displayed on the display unit 151 in a state that a home screen page is displayed on the display unit 151. Furthermore, the second touch sensing mode is carried out by the foregoing execution method of the second touch sensing mode, and the home screen page is partitioned into the first and the second region 252, 253.

In this state, when a touch input is applied to a specific icon 252a, the execution screen 252b of an application associated with the first screen region 251a is displayed on the display unit 151. The execution screen 252b may include an input window 258, and for such an example, the application may be a message application. In this case, the input window 258 is formed to receive data for message transmission.

According to the drawing, when the input window 258 is selected through an input to the first region 252, a virtual keyboard 259 is displayed in the first region 252. In other words, the first region 252 which has been a region to which a touch to the second region is applied is converted into a keyboard input region. Furthermore, when the input window 258 is selected, the indicator 254 that has indicated the input window may disappear along with the output of the virtual keyboard 259.

The virtual keyboard 259 is located within a first region with a quadrant circle shape, and thus may be formed in a semi-circular shape. However, as the first region is increased in the width direction of the terminal when displaying the virtual keyboard 259, a QWERTY layout may be formed on the virtual keyboard 259.

Furthermore, as illustrated in the drawing, the virtual keyboard 259 displays only part of the QWERTY layout, and another part of the QWERTY layout may be formed to be displayed in the first region.

The boundary of the virtual keyboard 259 may be the same line as that of the boundary line 255 for dividing the first and the second region 252, 253. Accordingly, an icon 255a that is movable by a drag input is displayed on the boundary (or the boundary line) of the virtual keyboard 259, and the boundary line 255 is changed according to the movement of the icon 255a. The virtual keyboard 259 has the shape of filling all of the first region 252, and thus the size of the virtual keyboard 259 is adjusted by the movement of the icon 255a.

Furthermore, even when the virtual keyboard 259 fills up the first region, the virtual keyboard 259, the virtual keyboard 259 may be displayed in a transparent or semi-transparent manner not to hide the execution screen of the application.

The virtual keyboard 259 receives a control command using a direct touch. For such an example, the second touch sensing mode is released and the first touch sensing mode is carried out to display the virtual keyboard 259.

For another example, the present disclosure may be carried out in such a manner that the second touch sensing mode is maintained, but the virtual keyboard 259 is enabled to receive a direct touch input. In this case, the first touch sensing mode may be carried out only when there is another input (any one of the foregoing examples) for releasing the second touch sensing mode.

For another example, the virtual keyword may be formed to receive a handwriting input using a proximity touch as well as receive an input using a direct touch.

Figure 9:
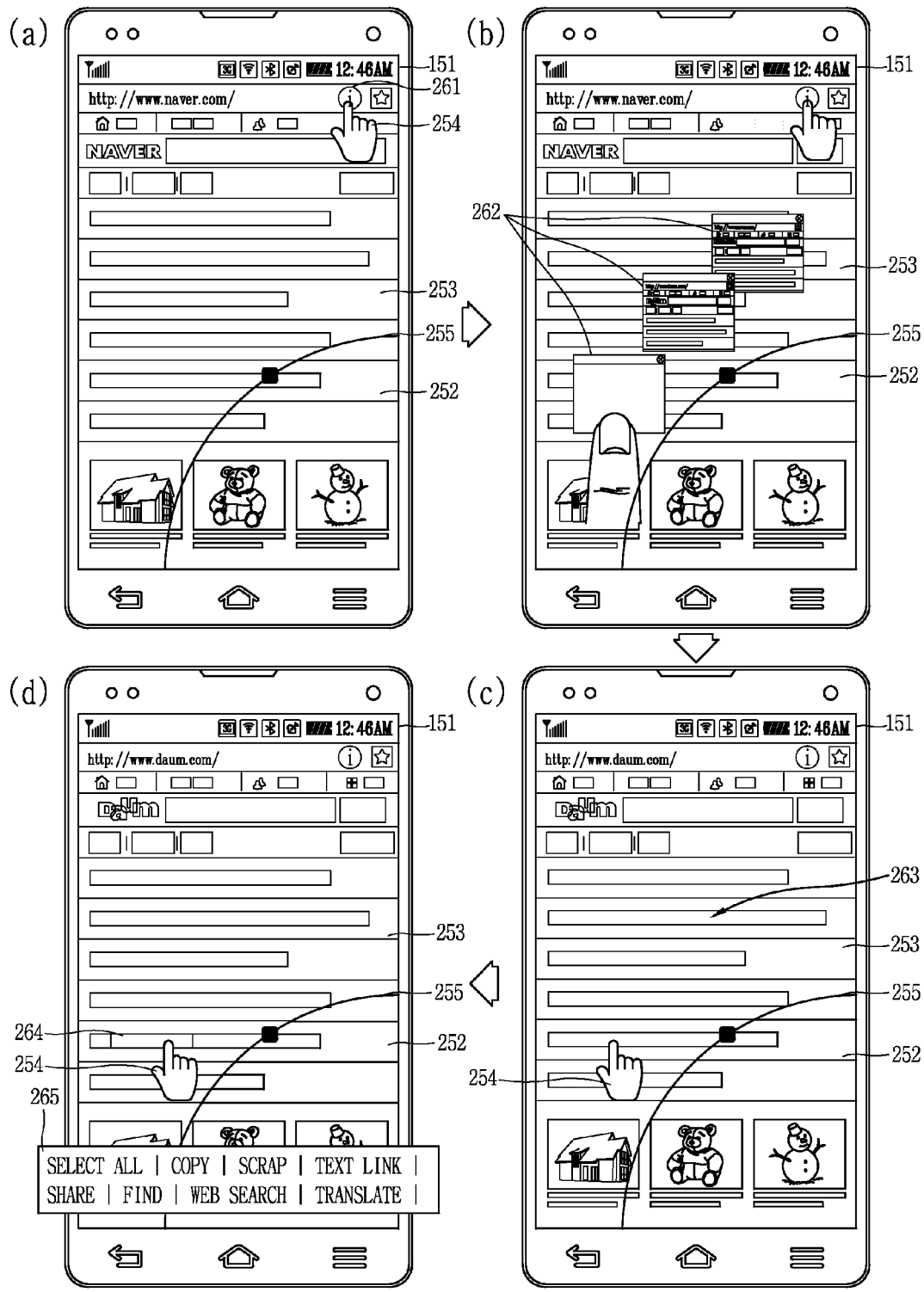
Figure 10:
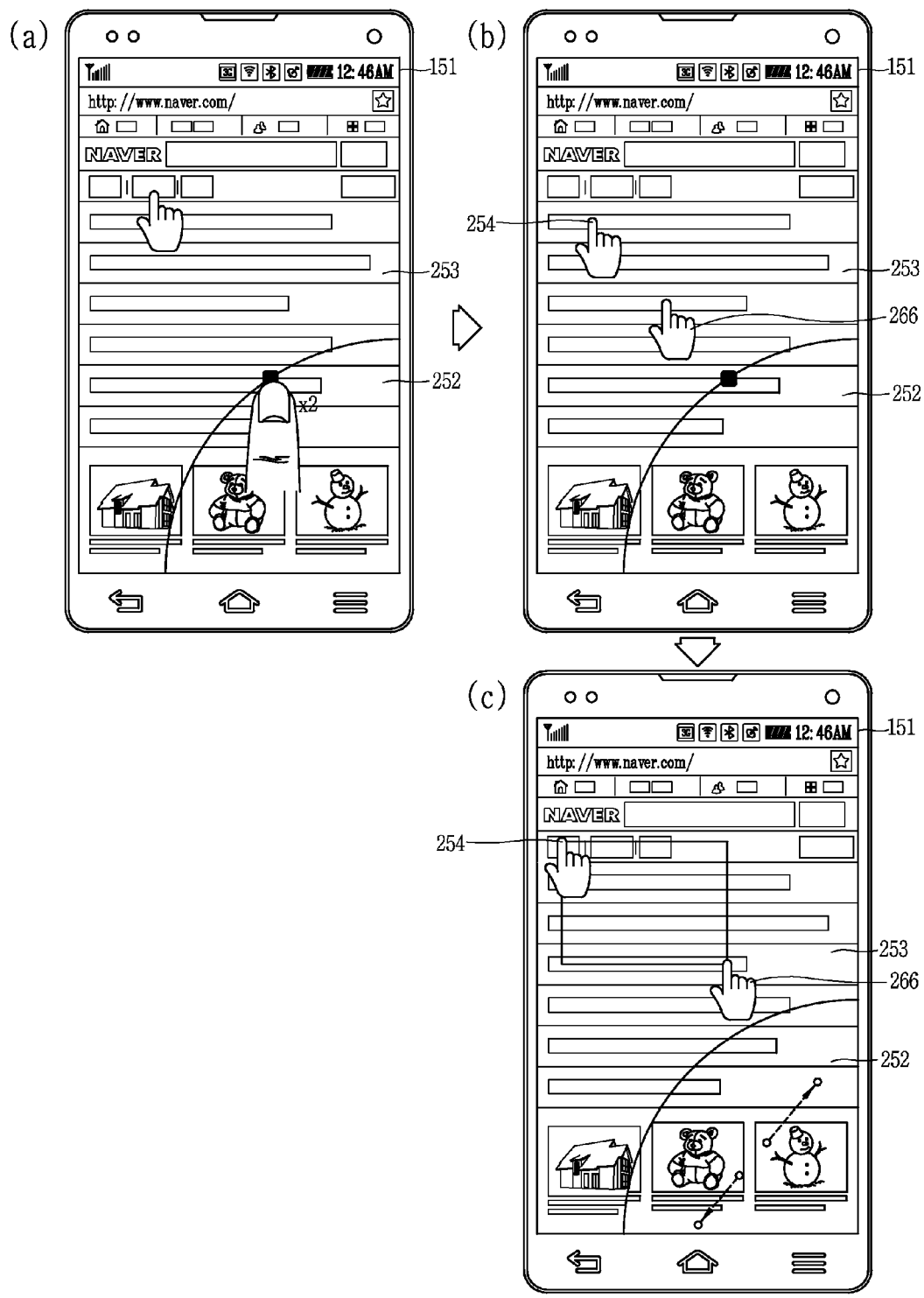
Figure 11:
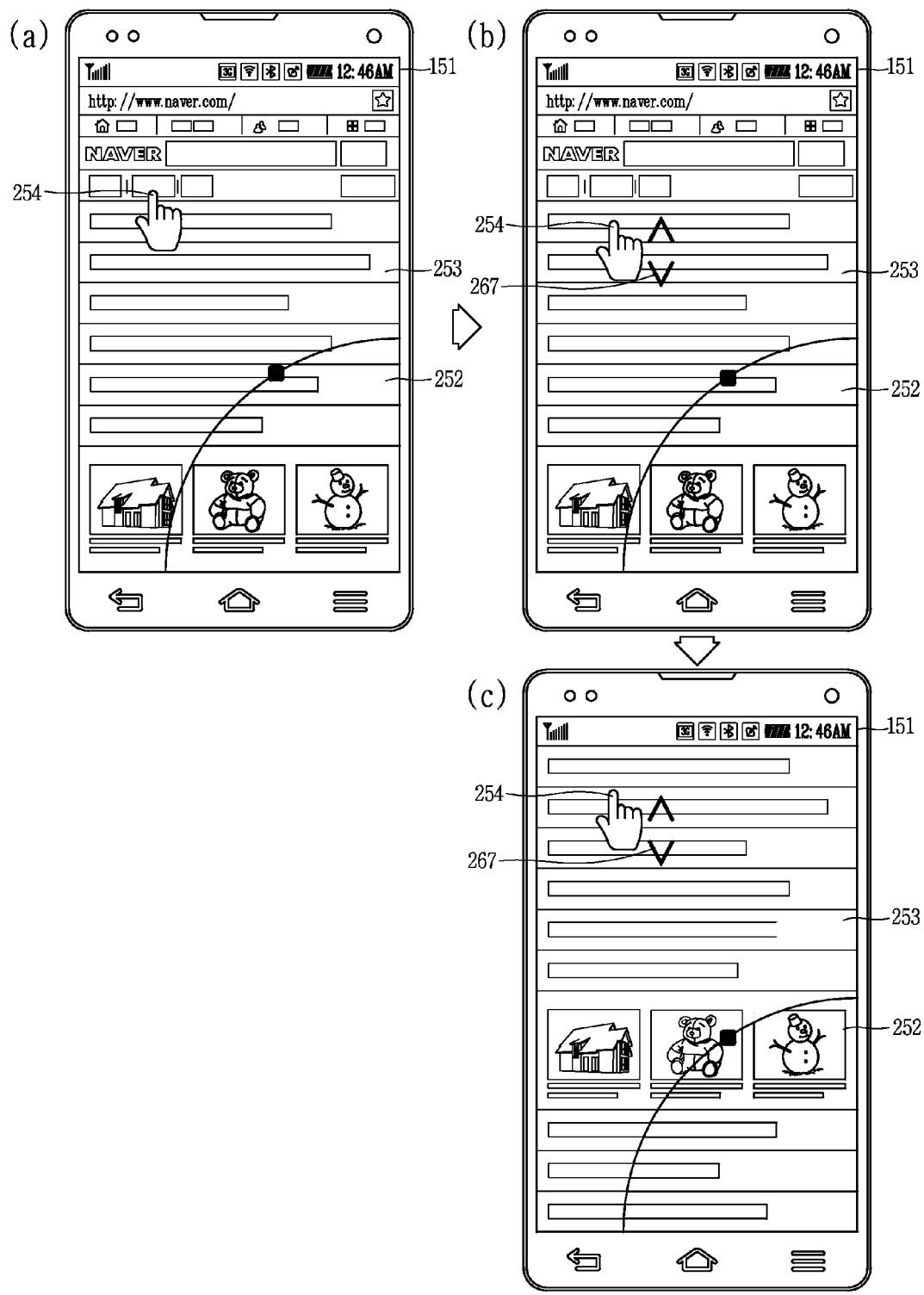

FIGS. 9 through 11 illustrate an example of a method of using a second touch sensing mode in a web browser, as one embodiment of the control method of FIG. 5.

Referring to FIG. 9, when an icon for displaying specific information displayed in the second region 253 is selected by a touch input to the first region 252 subsequent to entering the second touch sensing mode, the specific information may be displayed on the boundary line 255.

For example, as illustrated in FIG. 9A, the execution screen of a web browser application may be displayed on the display unit 151. The terminal enters the second touch sensing mode to be overlapped with the execution screen, thereby displaying a boundary line for dividing the first and the second region 252, 253.

As a position for applying a direct touch in the first region 252 is moved, the indicator 254 displayed in the second region 253 is moved to be located at a specific icon 261 of the web browser. In this state, when the specific icon 261 is clicked, specific information associated with the specific icon 261 will be displayed in the form of thumbnails on the boundary line. The foregoing methods may be all used for the click of the specific icon 261. However, for another example, an object body (finger, etc.) for applying a touch to the first region 252 may apply a direct touch to the first region 252 in a state that the indicator 254 is overlapped with the specific icon 261, thereby implementing the click.

For more specific example, the specific icon 261 may be a tap button as illustrated in FIG. 9B, and the open web pages 262 of the web browser are displayed in the form of thumbnails on the boundary line when the tap button is clicked.

Though not shown in the drawing, for another example, the specific icon 261 may be a status bar. When the status bar is clicked using the foregoing method in a state that the status bar and indicator 254 are overlapped with each other, a status display window may be displayed on the boundary line. The status display window denotes a window generated with notification items. However, the present disclosure may not be necessarily limited to this, and the status display window may be displayed in the first region 252.

As illustrated in FIG. 9C, when any one of the web pages 262 in the form of thumbnails is selected by the user's direct touch, the selected any one web page 263 is displayed as a whole as an execution screen of the web browser.

Furthermore, the first region may perform a clipboard function to perform a clip function for the execution screen of the web browser. As illustrated in FIGS. 9C and 9D, if a long touch is applied to the first region 252 while the indicator indicates a specific text, then an edit window 265 may be displayed when configuring a text region 264. The text may be edited by a direct touch to the edit window 265. For another example, the size of the text region 264 may be adjusted when moving the indicator 254.

For still another embodiment, referring to FIG. 10, when a consecutive touch input is applied to the same position in the first region 252 in a state that the indicator 254 is displayed, an additional indicator 266 may be displayed, and the indicator 254 and additional indicator 266 may be moved by a multi-touch applied to the first region 252.

More specifically, as illustrated in FIG. 10A, the execution screen of a web browser application may be displayed on the display unit 151. When entering the second touch sensing mode, it is overlapped with the execution screen to display a boundary line 255 for dividing the first and the second region 252, 253, an indicator 254, an icon 255b for moving the boundary line, and the like may be displayed.

When a double touch input is applied to the first region 252 in this state, the additional indicator 266 is popped up in the second region 253. The double touch input may be implemented with any form such as a double touch for approaching the display unit by a proximity touch, a double touch for making contact with the display unit by a direct touch, or the like.

Furthermore, though a double touch input to the first region 252 is illustrated in the present disclosure, the additional indicator 266 may be displayed when a double touch input is applied to the icon 255b for moving the boundary line.

In this case, the multi-touch may be a gesture in which touch positions move closer or away from each other, and information displayed in the second region by the gesture may be zoomed out or in as illustrated in FIGS. 10B and 10C. Furthermore, the indicator 254 and additional indicator 266 may move in the direction of getting away or closer to each other in connection with the zoom-out or zoom-in.

Finally, FIG. 11 illustrates that when a long touch is applied to the icon 255b for moving the boundary line, a touch input to the second region 253 is processed as a different control command from a control command that has been defined prior to applying the long touch.

More specifically, when the user applies a long touch to the icon 255b located on the boundary line 255, an image 267 notifying that vertical scrolling is enabled is displayed on the display unit 151 while changing the color of the indicator 254. At this time, when the user makes a direct touch and then applies a drag input to the first region 252, the execution screen of a web browser displayed on the display unit 151 is scrolled. However, the present disclosure may not be necessarily limited to this, and the scrolling may be carried out as the user moves a proximity touch within the first region 252.

Figure 12:
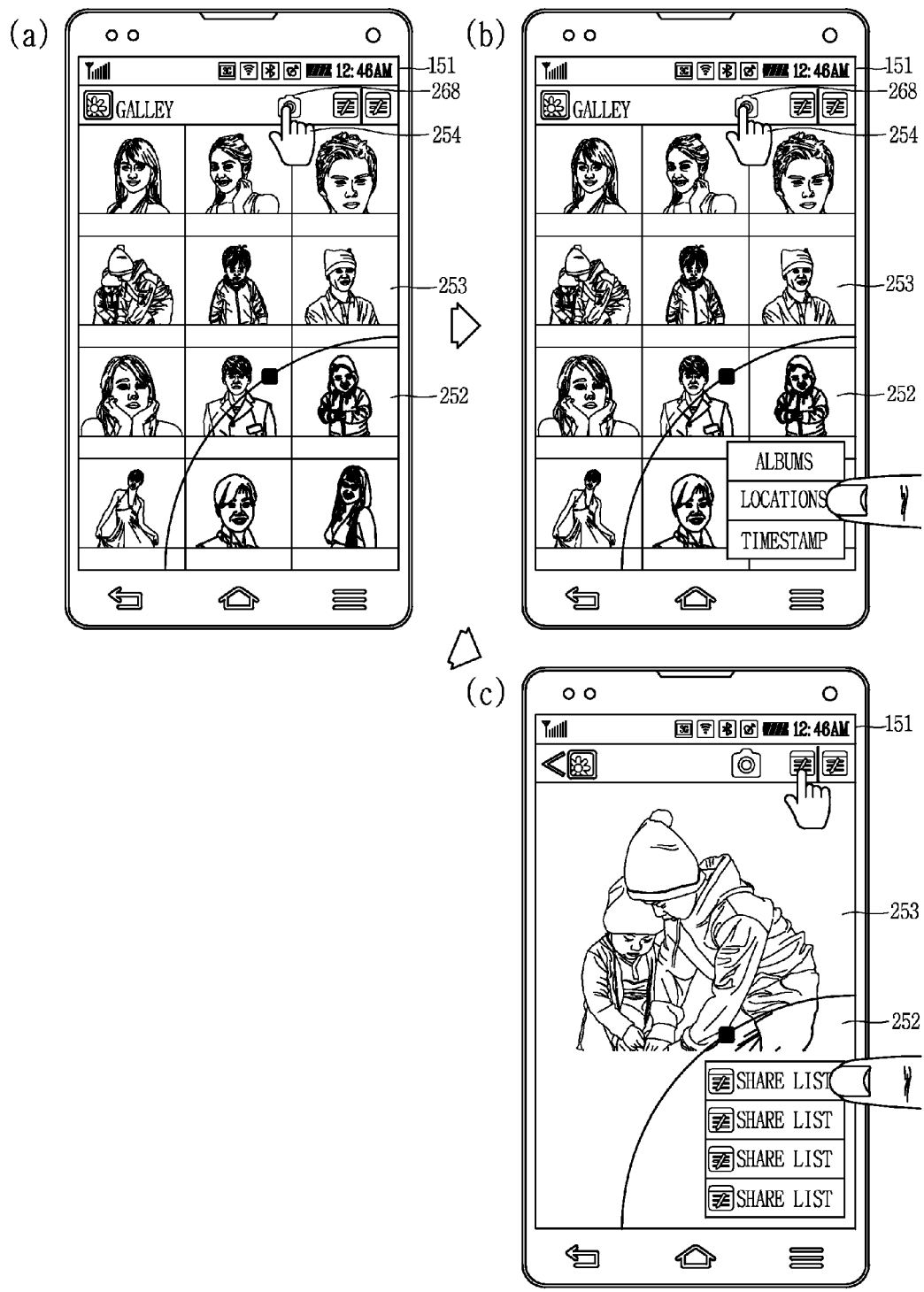

FIG. 12 illustrates an example of a method of using the second touch sensing mode in a gallery application, as an extended example of the control method of FIG. 5.

Referring to FIG. 12, when an icon for displaying specific information displayed on the execution screen of an application is selected by a touch input to the first region 252 subsequent to entering the second touch sensing mode, the specific information may be popped up in the first region.

More specifically, a gallery application may be carried out to display a function button 268 at an upper end of the screen in a state that images are displayed in the form of thumbnails.

As a position for making an indirect touch in the first region 252 is moved, the indicator 254 displayed in the second region 253 is moved to be located at the function button 268. When the function button 268 is clicked, specific information associated with the function button 268 are displayed in the first region 252. The foregoing methods may be all used for the click of the function button 268.

The displayed specific information may be a popup window indicating the items of the relevant functions. Furthermore, the items displayed on the popup window may be selected by a direct touch (more specifically, a direct touch to the item) to the first region.

For such an example, when a location information icon is selected from the items, the location information of each thumbnail is displayed.

For another example, as illustrated in FIG. 12C, when a share icon is selected, the items of sharable applications are displayed on the popup window. In this case, when a specific item (for example, messenger application) is selected, an application associated therewith can be carried out.

Figure 13:
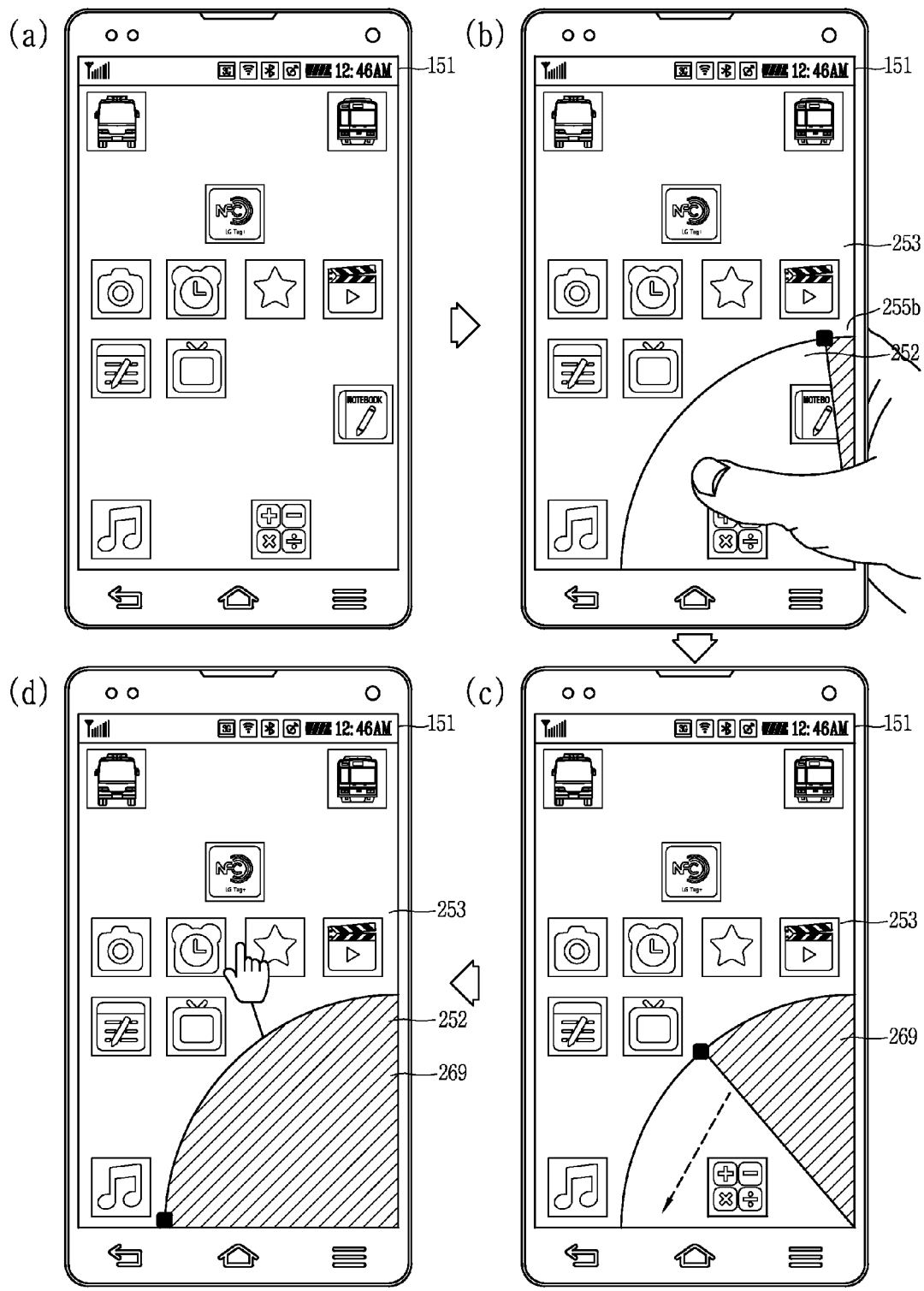

FIG. 13 is a conceptual view illustrating a case where a touch pad is displayed in the first region.

Referring to the drawing, a virtual touch pad 269 is displayed in the first region 252 in the second touch sensing mode, and a touch input to the virtual touch pad 269 is processed as a touch input to information displayed in the second region 253. Furthermore, in this case, the first region 252 may be generated by a drag input for moving the icon 255*b* when drawing a rotation locus along the boundary line 255. However, according to the present illustration, the display of the virtual touch pad 269 and generation of the first region 252 are described as one embodiment, but may be also applicable to a terminal as independent embodiments to each other.

For more specific example, referring to FIG. 13A, a fingerprint sensor 261 is disposed on a front surface of the terminal, and when the user applies a flicking touch to the fingerprint sensor 261, the terminal enters the second touch sensing mode.

Referring to FIG. 13B, the display unit 151 is partitioned into the first and the second region 252, 253 in the second touch sensing mode by the boundary line 255, and the icon 255*b* is displayed on the boundary line 255. According to the drawing, the first region 252 and second region 253 may be regions with different types of displayed information or regions for partitioning one graphic user interface (GUI) on the display unit. At this time, the terminal processes a touch input within the first region 252 as a touch input to the second region 253.

Referring to FIGS. 13C and 13D, when the user drags the icon 255*b* along the boundary line 255, a virtual touch pad 269 is displayed in the first region 252. The touch pad 269 may be formed in a region connecting a corner portion of the first region to the initial location and moved location of the icon 255*b*. Accordingly, as the icon 255*b* is moved along the boundary line 255, the size of the touch pad 269 can be adjusted.

The touch pad 269 as a non-transparent region may be a region for receiving a touch based on the user's direct touch. A touch to the second region 253 may be carried out by a touch input applied to the touch pad 269. In other words, the touch pad 269 may be an input unit for adjusting an indicator displayed in the second region. For another example, when a touch input with a specific pattern is applied through the touch pad 269, the terminal may perform a function corresponding to the specific pattern. For example, when the specific pattern is "C" representing a phone call, a phone call is carried out by the touch input.

Finally, when the icon is dragged in the direction toward the second region 253 out of the boundary line, the second touch sensing mode may be released. In this case, it may be restored to a second touch sensing mode with no touch pad as illustrated in FIG. 13B. However, the present disclosure may not be necessarily limited to this, the first touch sensing mode may be also carried out while the touch pad and second region 253 disappear when releasing the second touch sensing mode.

In this manner, according to the present disclosure, the user's touch input within the first region may be processed as a touch input to the second region, thereby implementing a new type of user interface.

According to the present disclosure, the user's touch input within the first region may be processed as a touch input to the second region, the user can make a touch input up to a distant portion using only his or her hand holding the terminal. Through this, it may be possible to implement a new type of user interface associated with its input.

Furthermore, according to the present disclosure, touch inputs are distinguished from each other based on the proximity touch and direct touch, thereby using one region in various ways.

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal comprising:
a touch screen; and
a controller cooperating with the touch screen such that a user can operate the mobile terminal in a first touch sensing mode or a second touch sensing mode,
wherein the controller processes a touch input applied to a position on the touch screen as a control command for the same position on the touch screen, in accordance with the first touch sensing mode, and
wherein the controller processes a touch input applied to a position in a first region of the touch screen as a control command for a position in a second region of the touch screen, in accordance with the second touch sensing mode,
wherein movement, in a first direction, associated with the touch input in the first region causes corresponding movement of an indicator displayed in the second region, in accordance with the second touch sensing mode,
wherein a distance moved by the indicator in the second region is proportional to the movement speed of the touch input in the first region,
wherein the indicator is moved to a first icon adjacent to the indicator among icons displayed on a movement path of the indicator when the movement speed of the touch input is a first speed, and
wherein the indicator is moved to a second icon far away from the indicator among icons displayed on the movement path of the indicator when the movement speed of the touch input is a second speed which is faster than the first speed.

2. The mobile terminal of claim 1, wherein the indicator specifies only an icon at the end of the indicator's movement path in the second region if the speed of the touch input movement in the first region exceeds a preset speed.

3. The mobile terminal of claim 1, wherein the indicator is displayed in the second region when the controller processes the touch input applied to the position in the first region, wherein an additional indicator is displayed in the second region when the controller processes a double-touch input applied to the position in the first region, and wherein movement of the indicator and the additional indicator in the second region is caused by multi-touch input movement in the first region.

4. The mobile terminal of claim 3, wherein a zoom-in multi-touch movement in the first region causes the indicator and the additional indicator to move away from each other in the second region, and wherein a zoom-out multi-touch movement in the first region causes the indicator and the additional indicator to move towards each other in the second region.

5. The mobile terminal of claim 1, wherein the touch input applied to the position in the first region of the touch screen is a direct touch, in accordance with the second touch sensing mode.

6. The mobile terminal of claim 1, wherein the touch input applied to the position in the first region of the touch screen is a proximity touch, in accordance with the second touch sensing mode.

7. The mobile terminal of claim 6, wherein movement, perpendicular to the first direction, associated with the proximity touch in the first region causes the selection of an item in the second region specified by the indicator.

8. The mobile terminal of claim 1, wherein a virtual keyboard is displayed in the first region when an input window for entering text in the second region is specified by the indicator and selected by the user as a result of a touch input in the first region.

9. The mobile terminal of claim 8, wherein touch inputs on the virtual keyboard displayed in the first region cause text to appear in the input window displayed in the second region.

10. The mobile terminal of claim 1, wherein a virtual touchpad is displayed in the first region, in accordance with the second touch sensing mode, and wherein the controller processes a touch input applied to the virtual touchpad as a control command for a position in the second region.

11. The mobile terminal of claim 1, wherein the first region is disposed adjacent to at least one corner of the touch screen and the second region occupies at least a majority of the remaining space associated with the touch screen, in accordance with the second touch sensing mode.

12. The mobile terminal of claim 1, wherein a boundary line is displayed on the touch screen, the boundary line separating the first region from the second region.

13. The mobile terminal of claim 12, wherein the user can manipulate the boundary line to adjust the size of the first region and the second regions relative to each other.

14. The mobile terminal of claim 12, wherein the second touch sensing mode is initiated and the boundary line is generated between the first and second regions by dragging an icon rotationally along a path on the touch screen corresponding to the boundary line.

15. The mobile terminal of claim 1, wherein the control command for the position in the second region causes information to be at least partially displayed in the first region, in accordance with the second touch sensing mode.

16. The mobile terminal of claim 1, wherein the controller processes the touch input applied to the position in the first region as a different control command for the position in the second region, in accordance with the second touch sensing mode, if a time duration associated with the touch input exceeds a preset time duration.

17. The mobile terminal of claim 1, wherein the controller initiates the second touch sensing mode upon sensing at least one of the user's fingerprint and a user gesture; comparing at least one of the fingerprint and gesture with pre-set criteria, and initiating the second touch sensing mode based on the comparison of the fingerprint or gesture to the pre-set criteria.

18. The mobile terminal of claim 17, wherein the controller causes the mobile terminal to exit the second touch sensing mode and to return to the first touch sensing mode upon receiving a control command for releasing the second touch sensing mode.

* * * * *